United States Patent [19]

Lewis

[11] Patent Number: 5,666,042

[45] Date of Patent: Sep. 9, 1997

[54] SWITCHING CURRENT SPIKE LIMITER FOR THREE PHASE COUPLED INDUCTOR CONDUCTIVE BATTERY CHARGER

[75] Inventor: Dave Lewis, Torrance, Calif.

[73] Assignee: Delco Electronics Corp., Kokomo, Ind.

[21] Appl. No.: 515,084

[22] Filed: Aug. 21, 1995

[51] Int. Cl.$^6$ ........................................... H02J 7/04
[52] U.S. Cl. ........................... 320/40; 320/49; 361/101; 363/89
[58] Field of Search ........................... 320/21, 49, 57, 320/39, 40; 361/18, 88, 86, 84, 90, 118, 100, 101; 363/89, 124, 46, 50, 57, 78, 79, 84

[56] References Cited

U.S. PATENT DOCUMENTS

| 3,573,554 | 4/1971 | Thoebald | 361/90 |
|---|---|---|---|
| 4,368,499 | 1/1983 | Stiffer | 361/90 |
| 4,509,774 | 4/1985 | Hoffman | 320/9 |
| 4,510,431 | 4/1985 | Winkler | 320/1 |
| 5,019,952 | 5/1991 | Smolenski et al. | 363/16 |
| 5,161,082 | 11/1992 | Alfonso | 361/18 |
| 5,191,520 | 3/1993 | Eckersley | 363/72 |
| 5,479,119 | 12/1995 | Tice et al. | 327/74 |

FOREIGN PATENT DOCUMENTS

| 0349837 | 1/1990 | European Pat. Off. | 361/90 |
|---|---|---|---|
| 3004521 | 8/1980 | Germany | 361/118 |
| 3827881 | 2/1990 | Germany | 361/90 |

*Primary Examiner*—Peter S. Wong
*Assistant Examiner*—Gregory J. Toatley, Jr.
*Attorney, Agent, or Firm*—Mark A. Navarre

[57] ABSTRACT

A polyphase boost inductor battery charger having a switching current spike limiter that employs a switching transistor, such as a bipolar, MOSFET, or IGBT transistors, for example. The switching current spike limiter includes a controller whose inputs are coupled to receive AC line voltage from a power source and battery voltage from a battery. A comparator is coupled to receive the AC line voltage and the battery voltage. Outputs from the controller and the comparator are coupled to an OR gate. An output of the OR gate is coupled through a switch driver to a series pass switch which comprises the switching transistor. The switching transistor is coupled to the inductor. A flyback diode is coupled across the output of the switching current spike limiter. The switching current spike limiter controls current spikes that flow when the AC line voltage ($V_{AC}$) peak is greater than the battery voltage ($V_{batt}$). To determine the condition $V_{AC}$ peak$>V_{batt}$ necessary for the switching transistor to be held OFF, the AC line voltage is compared to the battery voltage in the comparator. Hysteresis is applied to the comparator to avoid high frequency oscillation at its output.

3 Claims, 3 Drawing Sheets

5,666,042

1

SWITCHING CURRENT SPIKE LIMITER FOR THREE PHASE COUPLED INDUCTOR CONDUCTIVE BATTERY CHARGER

BACKGROUND

The present invention relates generally to battery chargers, and more particularly, to a polyphase boost inductor battery charger having a switching current spike limiter.

Polyphase boost inductor battery chargers are known in the battery charger art, as illustrated, for example, by the U.S. Pat. No. 5,099,186, assigned to General Motors Corporation, and incorporated herein by reference. As indicated in the above-referenced U.S. Pat. No. 5,099,186, such chargers include a voltage source coupled to the battery to be charged through two or more inductors and a polyphase transistor bridge. The transistors of the bridge are modulated on and off to build up current in the respective inductors, the current being circulated through the free-wheeling diodes of the bridge when the inductor voltage exceeds the battery voltage. In the U.S. Pat. No. 5,099,186, the charger is for the batteries of an electric vehicle, and the inductors are the windings of the vehicle's propulsion motor.

As indicated in the above-referenced U.S. Pat. No. 5,099,186, boost inductor battery chargers work well so long as the peak input voltage does not exceed the battery voltage. If the peak input voltage exceeds the battery voltage, a large, uncontrolled current would flow to the battery through the free-wheeling diodes of the bridge. This situation is obviously undesirable, and limits the utility of this type of battery charger.

While it is known to limit current using a resistor or a transistor operated in the linear region, such devices dissipate power, and therefore require large devices and expensive heat sinks. Typically, the charging current is limited to relatively low levels to control the heat dissipation.

Therefore, it is an objective of the present invention to provide for an improved polyphase boost inductor battery charger having a switching current spike limiter that overcomes the limitations of conventional chargers.

SUMMARY OF THE INVENTION

The present invention accomplishes input current limiting for a polyphase boost inductor battery charger of the type disclosed in the above-referenced U.S. Pat. No. 5,099,186 by the novel use of a transistor switch. The embodiment described herein is a three-phase boost inductor battery charger, but the present invention may be applied to any number of polyphase coupled inductors. The battery charger includes an AC power source coupled by way of an input filter capacitor and diode bridge to a switching current spike limiter in accordance with the present invention. The switching current spike limiter is coupled by way of windings of an inductor set to a three-phase transistor bridge. The output of the bridge is filtered by a filter capacitor and applied to terminals of a battery. A controller, comprising a pulse width modulated (PWM) driver is coupled to the AC power source and to an input clock and has control outputs coupled to the various bridge transistors.

The switching current spike limiter comprises a microprocessor controller and a comparator, both of which have inputs coupled to receive the line voltage of the AC power source and battery voltage from the battery. An OR gate has inputs coupled to the outputs of the microprocessor controller and the comparator. A series pass switch is coupled between the diode bridge and three-phase windings, along with a flyback diode from the output of the series pass switch to a return. A switch driver coupled to the output of the OR gate drives the series pass switch.

The switching current spike limiter operates such that if $V_{AC}$ peak $> V_{batt}$, then the series pass switch is held OFF. If $V_{AC}$ peak $< V_{batt}$, then the series pass switch is held ON. The switching current spike limiter thus controls current spikes that flow when the AC line voltage $V_{AC}$ peak is greater than the battery voltage. To determine the condition $V_{AC}$ peak $> V_{batt}$ necessary for the series pass switch to be held off, the AC line voltage is compared to the battery voltage in the comparator. Hysteresis is applied to the comparator to avoid high frequency oscillation at the output thereof.

The present invention has an advantage over a polyphase boost inductor charger with linear or resistive current limiting since the current limiting action is essentially non-dissipative except for switching and conduction losses. Without a current limiter, uncontrolled current spikes would result when the peak AC line voltage is greater than the battery voltage. Linear and resistive current limiters must be set to low current levels to avoid excessive power dissipation, hence the charging power is low. The present invention allows for higher charging currents in the limiting mode of $V_{AC}$ peak $> V_{batt}$, thus shortening the time to charge the battery.

The present invention applies specifically to electric vehicle polyphase boost inductor battery charging systems, although it may be useful in other applications as well.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
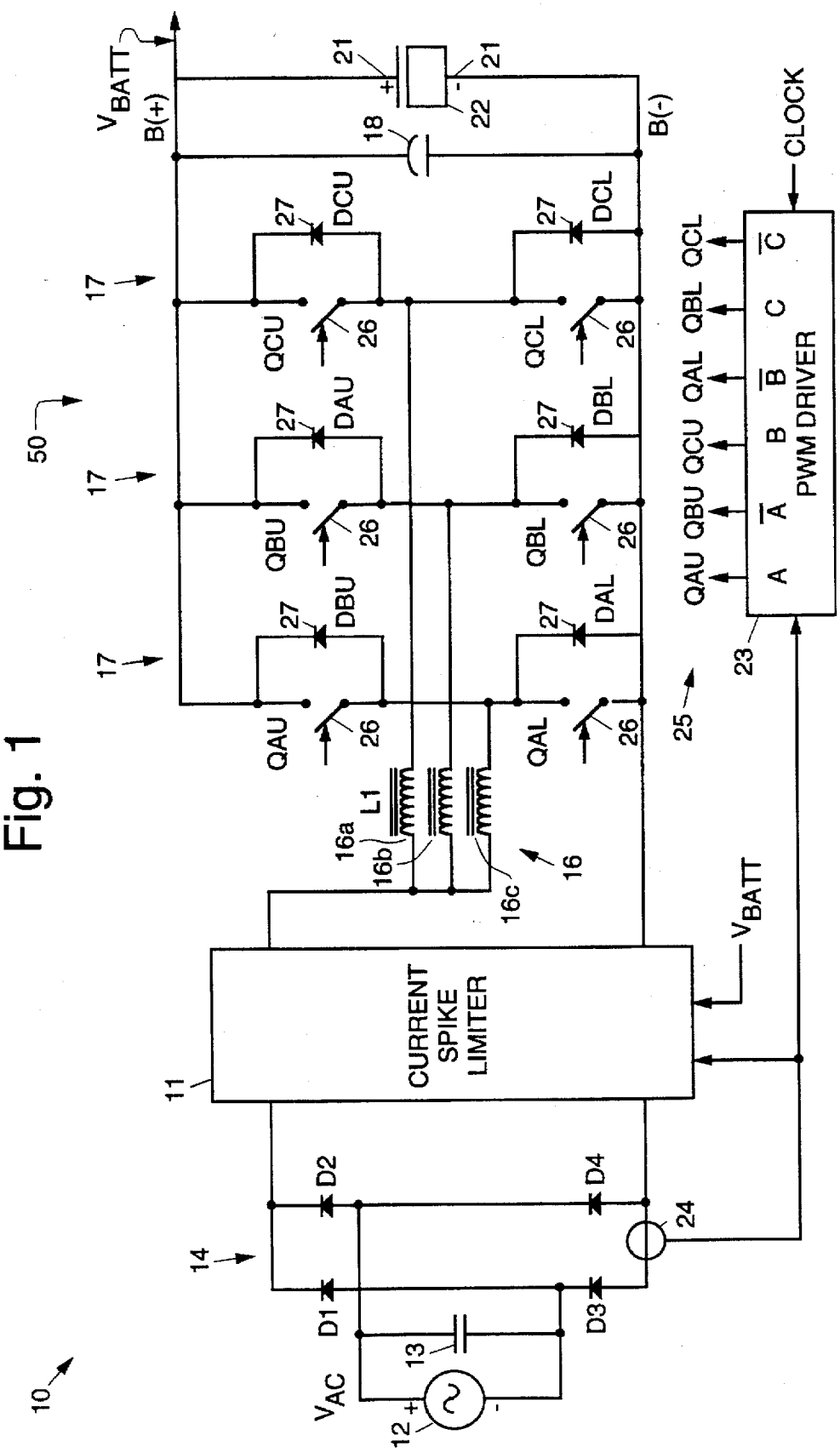
FIG. 1 illustrates a three-phase boost inductor battery charger that employs a switching current spike limiter in accordance with the principles of the present invention.

Referring to the drawing figures, FIG. 1 illustrates a three-phase boost inductor battery charger 10 comprising a switching current spike limiter 11 in accordance with the principles of the present invention. The three-phase boost inductor battery charger 10 includes a single-phase 60 Hz AC power source 12 whose output is coupled by way of an input filter capacitor 13 and a diode bridge 14 to inputs of the switching current spike limiter 11. The switching current spike limiter 11 is coupled to the neutral (N) of a three-phase winding set 16, the individual inductors 16a, 16b and 16c being respectively coupled to a three-phase full-wave bridge 50 comprising three pairs of switches 17. Each of the switches 17 may comprise a bi-polar transistor, FET, MOSFET or IGBT, for example, that are operated as switches. Each of the switches 17 includes a reverse or free-wheeling diode 27, either separate from the switches 17 or intrinsic to the switches 17. Outputs of the switches 17 are filtered by an output filter capacitor 18 and applied to the terminals 21 of a battery 22.

A pulse width modulated (PWM) driver 23 has inputs coupled to receive the line voltage of the AC power source 12 via sensor 24, and a clock input (CLOCK), and has control outputs 25 coupled to switching inputs 26 of each of the respective switches 17. In each of the three phases, the switches 17 of bridge 50 are controlled to boost the voltage at the output of switching current spike limiter 11 above the battery voltage $V_{batt}$ and the free-wheeling diodes 27 direct charging current to the battery 22. The PWM driver 23 boosts the voltage by pulse width modulating the lower switches QAL, QBL and QCL, in a concurrent or staggered fashion. When these switches are closed, or on, current is conducted through the respective inductors 16a–16c. when the switches are subsequently opened, or off, the inductor voltage rises above the battery voltage $V_{batt}$ and charging current is supplied to battery 22 through the free-wheeling diodes DAU, DBU and DCU. In each case, the current flows from the power source 12 to the battery 22 through the diodes D1–D4 of diode bridge 14, the switching current spike limiter 11, the inductors 16a–16c and the free-wheeling diodes DAU, DBU and DCU.

In a manner analogous to the above-referenced U.S. Pat. No. 5,099,186, the inductors 16a–16c are preferably the propulsion motor windings of an electric vehicle and the transistor bridge 50 is used for powering the motor from the battery 22, as well as for charging the battery 22 from the power source 12. In the battery charging mode described above, the upper switches QAU, QBU and QCU, and the lower free-wheeling diodes DAL, DBL and DCL are not utilized.

Figure 2:
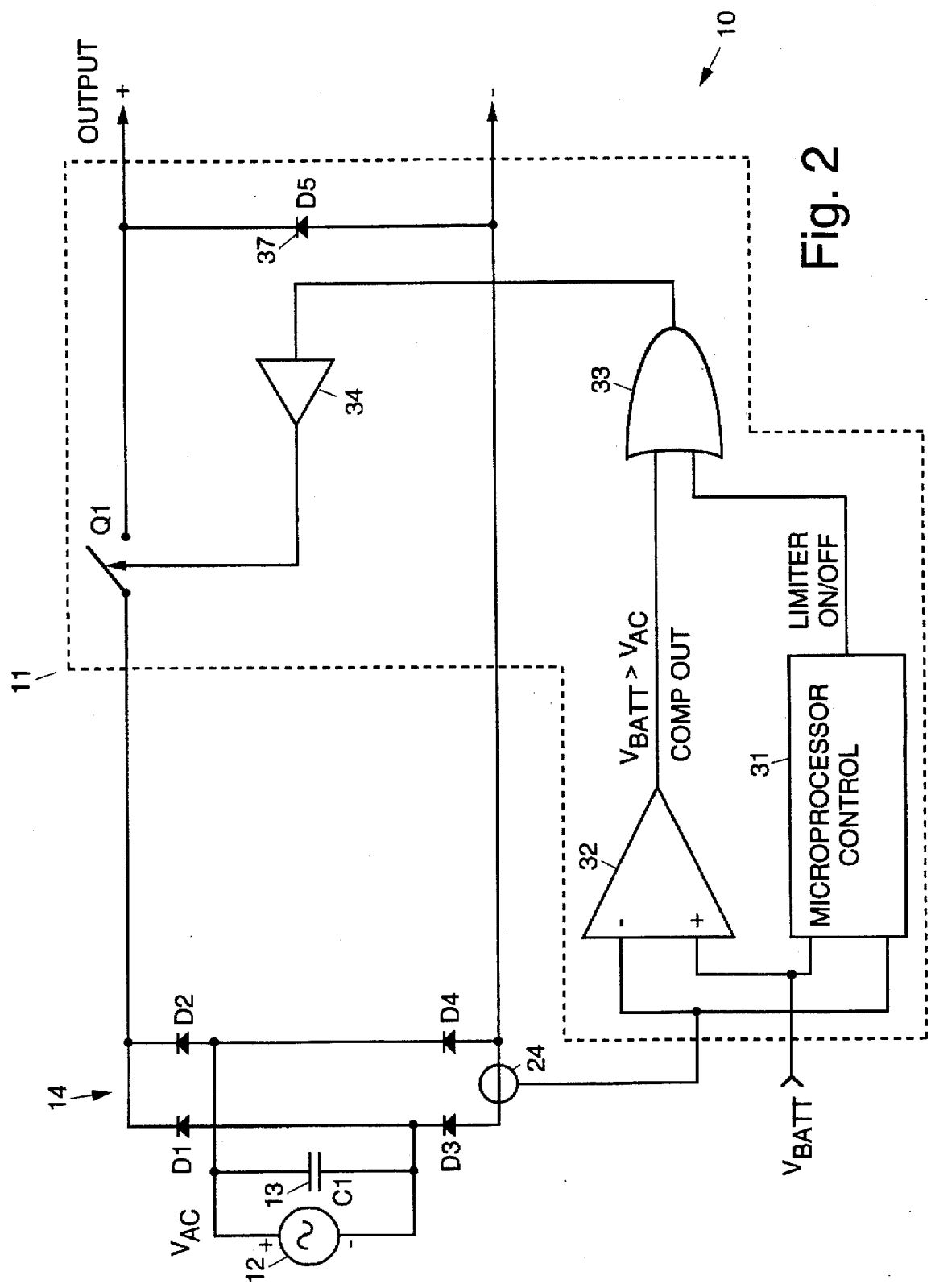
FIG. 2 shows a schematic of the switching current spike limiter.

FIG. 2 shows a detailed schematic of the switching current spike limiter 11 of FIG. 1, along with the power source 12, input filter capacitor 13 and diode bridge 14. The switching current spike limiter 11 is comprised of a microprocessor controller 31 whose inputs are coupled to receive the AC line voltage of the power source 12 from sensor 24 and battery voltage from battery 22. Outputs from the microprocessor controller 31 and the comparator 32 are coupled to an OR gate 33. An output of the OR gate 33 is coupled through a switch driver 34 to a series pass switch Q1 that comprises a transistor. The switch Q1 is coupled to the neutral (N) terminal of three-phase winding set 16. A flyback diode is coupled across the output of the switching current spike limiter 11.

The switching current spike limiter 11 operates as follows. If $V_{AC}$ peak>$V_{batt}$ then the transistor Q1 is held OFF. If $V_{AC}$ peak<$V_{batt}$ then the transistor Q1 is held ON. The switching current spike limiter 11 interrupts the normally uncontrolled input current that would flow when the AC line voltage $V_{AC}$ peak is greater than the battery voltage. The comparator 32 actuates the switch driver 34 to open the switch Q1 when $V_{AC}$ peak exceeds the battery voltage $V_{batt}$. Hysteresis is applied to the comparator 32 to avoid high frequency oscillation at the output of the comparator 32.

The microprocessor controller 31 monitors the AC line voltage and battery voltage to determine if limiting should be enabled. This could occur, for example, if the peak AC line voltage is very close to the battery voltage, such that the limiting function is ineffectual or not necessary. In this case, the microprocessor controller 31 could override a comparator signal that would otherwise interrupt the input current. To this end, the LIMITER ON/OFF output of microprocessor controller 31 is applied, along with the output of comparator 32, to OR gate 33 to obtain the drive signal for switch driver 34, and hence, series pass transistor Q1. In the illustrated embodiment, a high logic level signal produced by comparator 32 or microprocessor controller 31 will activate switch driver 34 to turn ON or close the series pass switch Q1.

Figure 3:
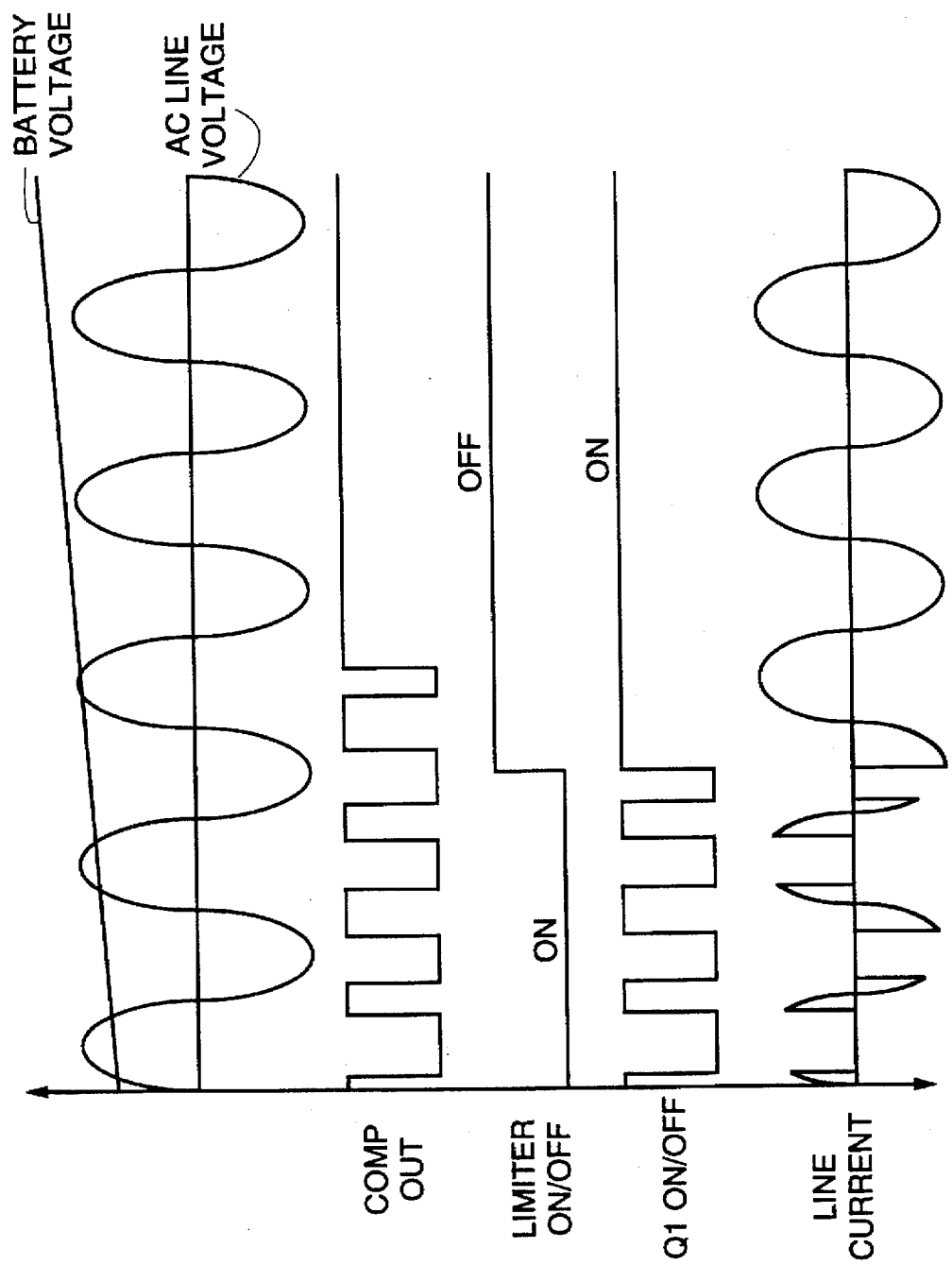
FIG. 3 shows graphs of waveforms depicting the operation of the switching current spike limiter of FIG. 2.

When the switching current spike limiter 11 turns the series pass transistor Q1 ON or OFF, the input current to the inductors 16a–16c is likewise switched on and off. FIG. 3 illustrates this principle by means of waveforms produced by the switching current spike limiter 11. FIG. 3 shows graphs of waveforms at different points in the switching current spike limiter 11 of FIG. 2 for a steady AC line voltage with increasing battery voltage. Initially, the LIMITER ON/OFF output of microprocessor controller 31 is low, enabling current spike limiting. In this mode, the comparator 32 produces a low output to open series pass switch Q1 each time the peak AC line voltage of power source 12 exceeds the battery voltage. Since the AC line voltage is full wave rectified by diode bridge 14, the negative cycles shown in FIG. 3 are inverted, and the switching current spike limiter 11 is operative to interrupt the input current in the same manner as for the positive cycles of the AC line voltage. As the battery voltage increases, the peak AC line voltage exceeds the battery voltage for briefer intervals, resulting in briefer interruptions of the input current, as seen in the line current waveform. At a point where the peak AC line voltage is very close to the battery voltage, such that the limiting function is ineffectual or not necessary, the LIMITER ON/OFF output microprocessor 31 becomes high, maintaining series pass switch Q1 in an on, or closed, state, thereby disabling the line current interruptions.

Thus there has been described a new and improved three-phase boost inductor battery charger that includes a switching current spike limiter. It is to be understood that the above-described embodiment is merely illustrative of the many embodiments which represent applications of the principles of the present invention. Clearly, numerous and other arrangements can be readily devised by those skilled in the art without departing from the scope of the invention.

What is claimed is:

1. An input current limited polyphase boost inductor battery charger comprising:

an AC power source;

a diode bridge coupled across the AC power source to define a rectified power source, such rectified power source being coupled to a boost inductor circuit through a current limiting switch, said boost inductor circuit including an inductor having a plurality of windings, a plurality of bridge switches coupled to respective windings of the inductor, a plurality of bridge diodes coupling respective windings to a battery to be charged, and a bridge controller for turning the bridge switches on and off to charge the battery with current delivered to said battery through said bridge diodes; and a current limit controller for monitoring the voltages of said AC power source and said battery and for turning the current limiting switch off to interrupt the coupling between the AC power source and the boost inductor circuit when the voltage of said AC power source is greater than the voltage of said battery.

2. The charger of claim 1 wherein the current limit controller comprises:

a comparator having inputs coupled to receive the voltages of the AC power source and the battery;

a switch driver coupled between the comparator and the current limiting switch; and a flyback diode coupled across said boost inductor circuit between said boost inductor circuit and said current limiting switch.

3. The charger of claim 1, wherein the current limit controller comprises:

a controller having inputs coupled to receive the voltages from the AC power source and the battery;

a comparator having inputs coupled to receive the voltages from the AC power source and the battery;

an OR gate coupled to outputs from the controller and the comparator;

a switch driver coupled between the output of the OR gate and the current limiting switch; and a flyback diode coupled across said boost inductor circuit between said boost inductor circuit and said current limiting switch.

* * * * *